F. FISHER.
HORSE RELEASER.
APPLICATION FILED NOV. 19, 1909.
978,281.
Patented Dec. 13, 1910.
2 SHEETS—SHEET 1.
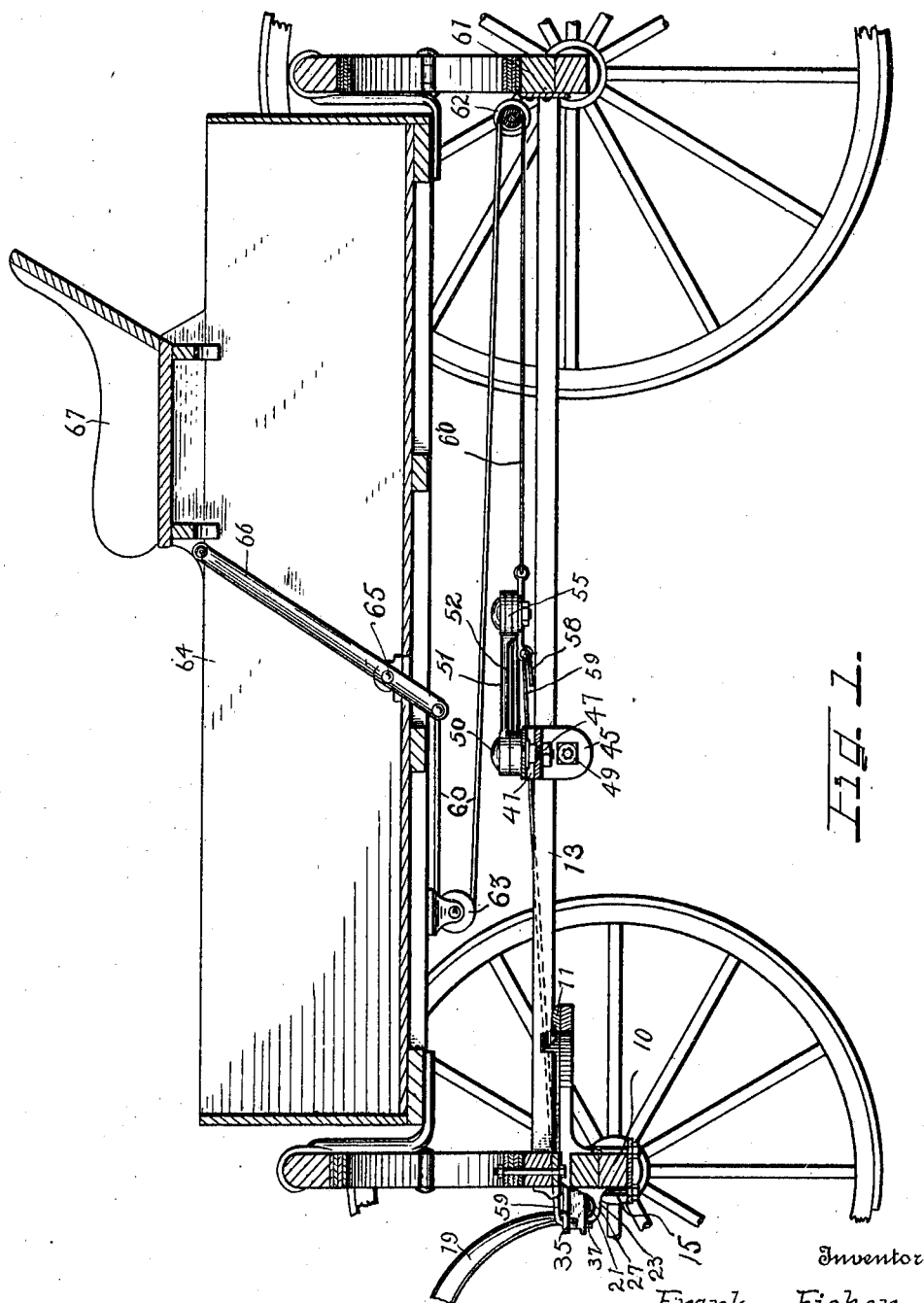
FIG. 1.
Witnesses
S. P. Buck.
C. N. Woodward.
Inventor
Frank Fisher.
By 
Attorneys F. FISHER.
HORSE RELEASER.
APPLICATION FILED NOV. 19, 1909.
978,281.
Patented Dec. 13, 1910.
2 SHEETS—SHEET 2.
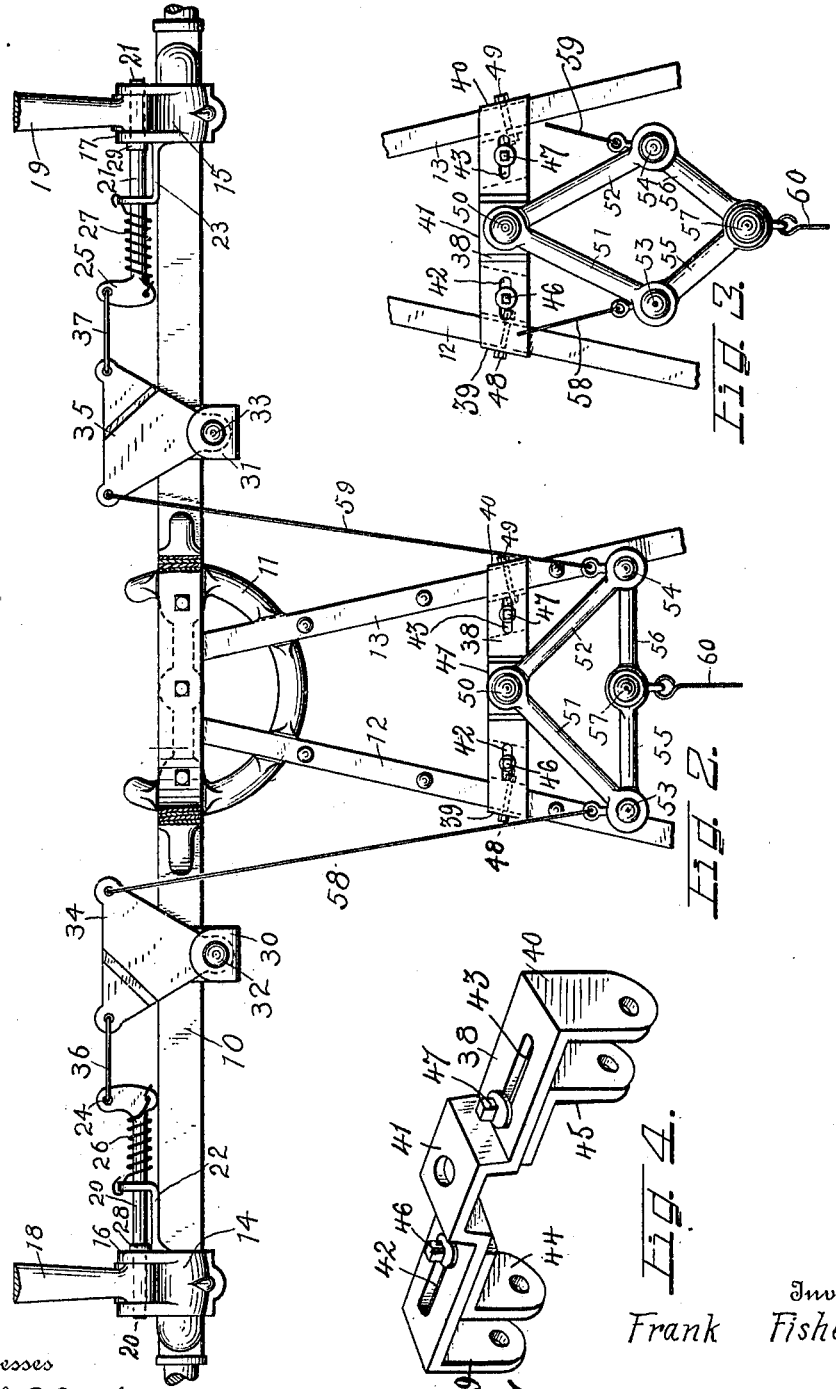
Witnesses
S. P. Buck.
C. K. Woodward.
Inventor
Frank Fisher
By
Attorneys

UNITED STATES PATENT OFFICE.

FRANK FISHER, OF REARDON, WASHINGTON.

HORSE-RELEASER.

978,281.

Specification of Letters Patent. Patented Dec. 13, 1910.

Application filed November 19, 1909. Serial No. 528,902.

*To all whom it may concern:*

Be it known that I, FRANK FISHER, a citizen of the United States, residing at Reardon, in the county of Lincoln, State of Washington, have invented certain new and useful Improvements in Horse-Releasers; and I do hereby declare the following to be a full, clear, and exact description of the invention, such as will enable others skilled in the art to which it appertains to make and use the same.

This invention relates to horse releasers of the class wherein provision is made for instantly releasing the horses from a vehicle in event of their becoming unruly or attempting to run away, and has for its object to simplify and improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a longitudinal sectional view of a conventional vehicle including the body and the running gear with the improved device applied. Fig. 2 is a plan view of the forward axle together with portions of the reach members and the shackle members of the thills, with the improvement applied, and in closed position. Fig. 3 is a detailed view of a portion of the operating mechanism showing the parts in open or released position. Fig. 4 is a perspective view, enlarged, of the clamp device whereby the mechanism is connected to the reach members.

The improved device is designed to be attached to axles of various structures and to reach members of various forms without material structural changes, and it is not desired therefore to limit the invention to any specific construction of axle or reach portions of the vehicle.

For the purpose of illustration a conventional axle is shown at 10, the fifth-wheel mechanism at 11, the reach members at 12—13. The thill clips are represented conventionally at 14—15 and are provided respectively with spaced perforated ears 16—17 in which the shackle members of the thills, represented conventionally at 18—19, are coupled by movable rods or bolts 20—21. The clip 14 is provided with a guide member 22 for the outer portion of the bolt 20, while the clip member 15 is provided with a similar guide member 23 for the outer portion of the bolt 21. The bolts 20—21 extend inwardly toward each other and terminate respectively in offsets 24—25 which form heads to the inner ends of the bolts, and between the heads and the guide members 22—23 springs 26—27 are arranged and operate to maintain the bolts yieldably in their outward positions or coupled to the shackle members as shown in Fig. 1. The bolt 20 is provided with a stop-collar 28, while the bolt 21 is provided with a stop-collar 29, the stop collars operating to limit the inward movement of the bolts under the influence of the springs.

Connected to the axle 10 at opposite sides of the fifth-wheel 11 are clips 30—31, and pivoted at 32—33 in these clips are clamp plates 34—35. The plate 34 is coupled to the offset 24 of the bolt 20 by a rod 36, while the member 35 is coupled to the offset 25 of the rod 21 by a rod 37.

Extending across the reach members 12—13 is a supporting plate 38 having down-turned ends 39—40 which bear against the outer faces of the reach members 12—13. The plate 38 is provided with an elevated central portion 41 and with longitudinal slots 42—43 at opposite sides of the elevated central portion.

Bearing beneath the plate 38 are L-shaped clamp members 44—45 which bear against the inner faces of the reach members, and are coupled to the plate 38 by clamp screws 46—47 operating through the slots 42—43. By this means the clamp members 44—45 may be adjusted toward and away from the down-turned ends 39—40 of the plate 38, and are thus rendered adjustable to fit reach members of various sizes. The down-turned terminals 39—40 and the down-turned portions of the clamp members 44—45 are transversely apertured to receive clamp bolts 48—49, the clamp bolts extending beneath the reach members. By this simple means it will be obvious that the plate 38 may be firmly clamped to the reach members and adapted to reach members of various sizes.

Mounted to swing at 50 to the elevated portion 41 of the plate 38 are two bars 51—52, and pivoted at 53—54 to the bars 51—52 at their outer ends are other bars 55—56, the latter bars being pivotally connected at their inner ends as shown at 57. A pull cable 58 is connected at one end to the pivot 53 of the bars 51—55 and connected at its other end to the member 34, while a similar pull cable 59 is connected at one end to the pivot 54 of the bars 52—56 and connected at the other end to the member 35. Another pull cable 60 is connected to the pivot 57 which unites the bars 55—56 and leads thence to a point convenient to the driver of the vehicle. By this arrangement it will be obvious that so long as no strain is applied to the pull cable 60 the springs 26—27 will hold the bolts 20—21 in engagement with the shackle members 18—19 and maintain the latter in coupled relations to the axle, and will remain in this condition so long as the horse is operating under normal conditions. In event, however, of the horse becoming unruly or attempting to run away the driver simply applies strain to the pull cable 60 with the result of drawing the bars 55—56—51—52 rearwardly or into the position shown in Fig. 3, this movement causing the pull cables 58—59 to operate the members 34—35 and draw the bolts 20—21 inwardly against the springs 26—27 and withdraw the bolts from engagement with the shackle members 18—19 and thus release the thills or tongue, as the case may be, from the vehicle. By this means the draft animal is instantly released from the vehicle, and all danger of disaster from the runaway thus obviated.

In Fig. 1 is shown the preferred means for actuating the pull cable 60, and this means will now be described. Connected to the rear axle 61 is a guide pulley 62, while a similar guide pulley 63 is located beneath the body 64 of the vehicle. Pivoted at 65 to the body 64 is a lever 66, the upper end of the lever being convenient to the seat 67, as shown. The pull cable 60 is conducted around the guide pulleys 62—63 and connected to the lower end of the lever 66, as shown. By this simple means it will be obvious that when the upper end of the lever 66 is moved forwardly strain will be applied to the pull cable 60 and the releasing mechanism actuated as above described.

It will be noted that the bars 51—52 and the bars 55—56 produce a frame which is pivotally connected at 50 to the supporting member 38, and when the springs 26—27 are in operative position as shown in Fig. 1, the frame produced by the bars will swing bodily upon the pivot 50 simultaneously with the swinging movement of the axle upon its fifth-wheel without cramping the parts or causing the displacement of the bolts 20—21. This is an important advantage in applicant's construction, and materially increases the utility and efficiency of the device.

The improved device is simple in construction, and can be applied, as before stated, without material structural changes to vehicles of various forms and constructions.

What is claimed is—

1. The combination with the running gear of a vehicle including the forward axle the thill clips and the reach members swingingly coupled to the axle, of thill shackle coupling bolts operating through the thill clips, a supporting device, means for detachably coupling said supporting device to the reach members, bars pivotally connected at one end to said supporting device, other bars pivotally united at their confronting ends and likewise pivotally connected respectively to the free ends of said first mentioned bars, connecting means between said first mentioned bars and said coupling bolts, and a pull device connected to said last mentioned bars at their coupled ends.

2. The combination with the running gear of a vehicle including the forward axle the thill clips and the reach members swingingly coupled to the axle, of thill shackle coupling bolts operating through the thill clips, a supporting device comprising a plate bearing upon said reach members and having down-turned ends engaging the outer faces of the same, clip members connected to said plate and bearing against the inner faces of the reach members, bars pivotally connected at one end to said supporting plate, other bars pivotally united at their confronting ends and pivotally connected respectively to the free ends of said first mentioned bars, connecting means between said first mentioned bars and the free ends of said coupling bolts, and a pull device connected to said other bars at their coupled ends.

In testimony whereof, I affix my signature, in presence of two witnesses.

FRANK FISHER.

Witnesses:
C. A. SMITHER,
HORACE H. GUTH.